United States Patent
Bartley

(10) Patent No.: US 6,244,044 B1
(45) Date of Patent: Jun. 12, 2001

(54) METHOD FOR REDUCING COLD-START HYDROCARBON EMISSIONS IN A GASOLINE, NATURAL GAS, OR PROPANE FUELED ENGINE

(75) Inventor: Gordon J. Bartley, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 09/399,878

(22) Filed: Sep. 20, 1999

(51) Int. Cl.$^7$ .................................................... F01N 3/00
(52) U.S. Cl. ................... 60/274; 60/284; 60/285; 60/289; 60/302
(58) Field of Search ................... 60/284, 285, 289, 60/302, 274, 273, 286, 301, 303, 606

(56) References Cited

U.S. PATENT DOCUMENTS

| | | |
|---|---|---|
| 3,657,892 | 4/1972 | Perga et al. . |
| 3,896,616 * | 7/1975 | Keith et al. ............................ 60/284 |
| 3,976,034 | 8/1976 | Shinohara et al. . |
| 4,033,133 * | 7/1977 | Houseman et al. ................... 60/606 |
| 4,109,461 | 8/1978 | Fujitani et al. . |
| 4,117,675 | 10/1978 | Tanaka et al. . |
| 4,188,763 | 2/1980 | Sayo et al. . |
| 4,215,541 * | 8/1980 | Tanaka et al. ........................ 60/284 |
| 5,140,811 | 8/1992 | Minami et al. . |
| 5,271,906 | 12/1993 | Yuuki et al. . |
| 5,313,792 * | 5/1994 | Katoh et al. ......................... 60/301 |
| 5,331,809 * | 7/1994 | Takeshima et al. .................. 60/289 |
| 5,343,699 * | 9/1994 | McAlister ............................ 60/273 |
| 5,412,946 * | 5/1995 | Oshima et al. ....................... 60/301 |
| 5,493,859 | 2/1996 | Shinohara et al. . |
| 5,560,202 * | 10/1996 | Hosoya et al. ....................... 60/284 |
| 5,577,383 * | 11/1996 | Kuroda et al. ....................... 60/284 |
| 5,603,215 * | 2/1997 | Sung et al. ........................... 60/284 |
| 5,603,216 | 2/1997 | Guile et al. . |
| 5,647,203 * | 7/1997 | Abe et al. ............................. 60/302 |
| 5,740,669 * | 4/1998 | Kinugasa et al. .................... 60/285 |
| 5,765,368 * | 6/1998 | Matsumoto et al. ................. 60/285 |
| 5,814,283 * | 9/1998 | Matuoka et al. ..................... 60/289 |
| 6,000,217 * | 12/1999 | Hochmuth ............................ 60/289 |
| 6,041,593 * | 3/2000 | Karlsson et al. ..................... 60/284 |
| 6,044,644 * | 4/2000 | Hu et al. .............................. 60/302 |
| 6,138,454 * | 10/2000 | Fournier et al. ..................... 60/286 |
| 6,151,890 * | 11/2000 | Hoshi ................................... 60/289 |

* cited by examiner

*Primary Examiner*—Thomas Denion
*Assistant Examiner*—Tu M. Nguyen
(74) *Attorney, Agent, or Firm*—Baker Botts L.L.P.

(57) ABSTRACT

A partial oxidation catalyst is interposed between an exhaust manifold and a catalytic converter in the exhaust system of a gasoline, natural gas, or propane fueled engine. The engine is started from a cold-start and the exhaust gas stream emitted during an initial period of operation after the cold-start has a $\lambda$ value <1 as a result of a rich combustion mixture provided to the engine during cold-start operation. Hydrocarbons passing through the partial oxidation catalyst during the initial engine operating period are partially oxidized and hydrogen produced as a result of the oxidation process is used to promote faster light-off of the catalytic converter in the exhaust system. Also, hydrocarbon emissions discharged into the surrounding environment are reduced during the initial period following cold-start.

3 Claims, 1 Drawing Sheet

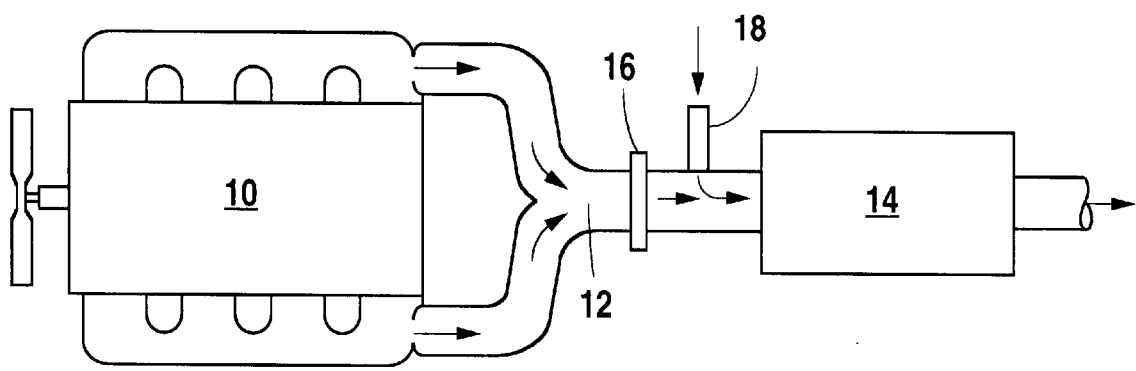

METHOD FOR REDUCING COLD-START HYDROCARBON EMISSIONS IN A GASOLINE, NATURAL GAS, OR PROPANE FUELED ENGINE

BACKGROUND OF THE INVENTION

1. Technical Field

This invention relates generally to a method for controlling hydrocarbon emissions from a gasoline, natural gas, or propane fueled engine, and more particularly to such a method for reducing hydrocarbon emissions during an initial engine operating period following a cold-start.

2. Background Art

Catalytic converters are commonly used to convert environmentally harmful tail pipe emissions from automotive internal combustion engines, such as hydrocarbons (HC), carbon monoxide (CO), and oxides of nitrogen ($NO_x$), to less harmful products such as carbon dioxide ($CO_2$), water ($H_2O$), and nitrogen ($N_2$). However, acceptable vehicle emission levels are becoming increasingly lower as evidenced by regulations imposed by the Environmental Protection Agency (EPA) and the California Air Resources Board (CARB) in the U.S.A., and by other government bodies in Europe and other areas of the world. Recent CARB standards, such as the Low Emission Vehicle (LEV) and the Ultra Low Emission Vehicle (ULEV), require extremely effective catalytic converters.

One of the main challenges to achieving lower overall emissions has been the problem of cold-start HC emissions. An engine cold-start is defined in 40 CFR §86, Subpart B, Appendix 1, titled Urban Dynamometer Driving Schedule for Light Duty Vehicles and Light Duty Trucks. Typically, the catalyst material in a catalytic converter must reach a sufficiently high temperature before it is capable of converting the harmful emissions. Therefore, there is an initial period of engine operation from a cold start before the catalytic material is heated to its active conversion temperature. This initial period typically extends from cold-start for about 45 seconds to as much as 240 seconds or longer, depending on catalyst volume and converter-exhaust system design. In addition to the catalytic material having a sufficiently high temperature, the exhaust gas must also be stoichiometric or lean, i.e. have a $\lambda$ value that is equal to or greater than 1, before the catalyst can effectively convert HC to $CO_2$ and $H_2O$. During cold-start, the exhaust gas mixtures are often fuel-rich ($\lambda<1$), to aid in efficient engine starting. The initial fuel-rich exhaust gas mixture, combined with low catalytic material temperature, result in a significant amount of the overall HC emissions being generated during the initial engine operating period following a cold-start. Once the engine reaches a designated operating temperature and comes under stoichiometric control, the HC emissions generally can be effectively reduced using current technology.

Reduction of cold-start HC emissions has been an area of considerable research and development in recent years. Several technologies have been developed in an attempt to reduce cold-start HC emissions. For example, secondary air, using air pumps, can be added to the exhaust stream to make the cold-start exhaust gas stoichiometric or lean at the catalyst, alleviating the problem of rich engine-out exhaust. However, this option adds weight, costs, and complexity to a vehicle, and for those reasons is not a desirable option. The secondary air is also relatively cool which can slow down the light-off of the catalyst.

Other attempts to overcome the discharge of relatively high levels of HC during the cold-start period of an engine include the use of Electrically-Heated Catalysts (EHCs). EHCs induce rapid catalyst heatup and accordingly faster light-off, i.e. the temperature at which the catalytic material becomes effective in promoting a catalytic reaction with the exhaust gas. EHCs can be very effective, but they also require considerable energy, which reduces the overall fuel efficiency of the vehicle. Stoichiometric, or lean engine-start strategies can also be used, but such strategies can cause problems with operating smoothness of the engine during the cold-start period. Latent heat devices have been demonstrated which maintain the catalyst at or near its operating temperature for several hours after the engine is switched off, allowing for faster light-off when the engine is restarted. Also, hydrogen has been pumped into the exhaust gas stream at a point before entry of the gas stream into the catalytic converter to facilitate faster catalyst light-off. Latent heat devices and hydrogen supplement systems add significant hardware, controls, complexity, and cost to an engine.

The present invention is directed to overcoming the problems set forth above. It is desirable to have a method for operating a gasoline, natural gas, or propane fueled, spark-ignition engine during a cold-start, without introducing excessive hydrocarbons into the surrounding environment. It is also desirable to have such a method that does not require lean-start control strategies, electrically-heated catalysts, latent heat devices, secondary air, or hydrogen injection. It is also desirable to have such a method that does not require extensive additional hardware or engine operating controls in order to function effectively.

SUMMARY OF THE INVENTION

In one aspect of the present invention, a method for reducing cold-start hydrocarbon emissions in a gasoline, natural gas, or propane fueled engine includes providing a partial oxidation catalyst between an exhaust port of the engine and a catalytic converter, and then starting the engine from a cold start. Exhaust gas, containing hydrocarbon, is discharged from the engine during an initial period of engine operation in which the air/fuel ratio of the exhaust gas has a $\lambda$ value of less than 1.0. The exhaust gas discharged from the engine during the initial cold-start period is passed through the partial oxidation catalyst at a flow rate sufficient to provide a residence time from about $10^{-2}$ seconds to $10^{-5}$ seconds whereby at least a portion of the hydrocarbon present in the exhaust gas discharged from the engine is partially oxidized. The exhaust gas passed through the partial oxidation catalyst is subsequently passed through the catalytic converter and then into the surrounding environment.

Other features of the method for reducing cold-start hydrocarbon emissions in a gasoline, natural gas, or propane fueled engine include injecting air into the exhaust gas passed through the partial oxidation catalyst prior to passing the exhaust gas to the catalytic converter during the initial period of engine operation. Yet another feature of the method includes the initial engine operation period beginning with starting of the engine from a cold-start and ending with the catalytic converter reaching a pre-determined operating temperature.

BRIEF DESCRIPTION OF THE DRAWINGS

A more complete understanding of the structure and operation of the present invention may be had by reference to the following detailed description when taken in conjunction with the accompanying sole drawing FIGURE which is a schematic representation of an engine having a partial oxidation catalyst disposed between the engine and a catalytic converter, in accordance with the method embodying the present invention.

DETAILED DESCRIPTION OF A PRESENTLY PREFERRED EXEMPLARY EMBODIMENT

The method embodying the present invention is directed to the use of partial oxidation (PO) catalysis to react hydrocarbons (HC) under rich exhaust conditions by converting at least a portion of the HC to carbon monoxide (CO) and hydrogen ($H_2$). The partial oxidation process only occurs under reducing conditions. Therefore, the PO process is particularly beneficial to cold-start engine-out exhaust operation which is rich, negating the need for secondary air to the PO catalyst. A stoichiometric exhaust is defined as having a lambda ($\lambda$) value of 1.0. A lean exhaust gas, i.e. having a surplus of air, has a lambda ($\lambda$) value of >1.0 and is characteristic of diesel combustion engines. A rich engine-out exhaust, as necessary for operation of a partial oxidation catalyst, has a lambda ($\lambda$) value of <1.0. An additional benefit of the method embodying the present invention, in which a partial oxidation catalyst is used during the initial cold-start, is that the $H_2$ produced is believed to promote faster light-off in the down stream catalytic converter.

Turning now to the drawing FIGURE, an exhaust system adapted for carrying out the method embodying the present invention includes a gasoline, natural gas, or propane fueled engine 10 having an exhaust manifold 12 in direct fluid communication with each of the exhaust ports of the engine, a conventional catalytic converter 14, and a partial oxidation catalyst 16 disposed between the exhaust manifold 12 and the catalytic converter 14. Preferably, the overall distance between the exhaust ports of the engine and the catalytic converter 14 is relatively short to minimize heat loss between the engine 10 and the catalytic converter 14. In one embodiment, discussed below in additional detail, an air injection nozzle 18 is interposed between the partial oxidation catalyst 16 and the catalytic converter 14.

In carrying out the method for reducing cold-start hydrocarbon emissions in a gasoline, natural gas, or propane fueled engine, in accordance with the present invention, the partial oxidation catalyst 16 converts at least a portion of the engine-out HC emissions into CO and $H_2$ under rich engine conditions, resulting in a reduction of tail pipe HC emission and the production of $H_2$ to facilitate light-off of the main catalyst system 14.

Partial oxidation refers to the conversion of HC into CO and $H_2$, as represented below:

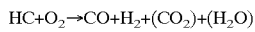

$$HC+O_2 \rightarrow CO+H_2+(CO_2)+(H_2O)$$

$CO_2$ and $H_2O$ are by-products of the reaction. Air/fuel ratio and space velocity are important parameters of the selectivity of the reaction to CO and $H_2$. PO catalysts work best under very rich conditions, i.e. $\lambda<1.0$, and preferably $\lambda \approx 0.4$, and short residence times of preferably from about $10^{-2}$ to $10^{-5}$ seconds.

The very short reaction time required for partial oxidation is advantageously suited to the method embodying the present invention since rich engine operation is beneficial to cold-start engine operation, and short residence time requirements allow the PO catalyst to have a very small volume. For example, the partial oxidation catalyst may have the shape of a relatively thin disk extending across the diameter of the exhaust pipe 12 having a thickness sufficient to provide a space velocity (i.e. the volume of gas per unit time with respect to the volume of the catalyst) of about $1\times10^6$ $hr^{-1}$. Thus, depending upon the diameter of the transverse by disposed PO catalyst across the exhaust pipe 12, the thickness may be on the order of about 1.3 cm to 2.5 cm (0.5 in. to 1 in.). Because of the low volume, the PO catalyst will heat up very quickly and become active in a very short period of time after engine cold-start. The production of $H_2$ as a product of the reaction is useful in promoting faster light-off of the down stream catalyst 14. Once the engine comes under stoichiometric control, i.e. exhaust gas-out $\lambda \approx 1.0$, the PO catalyst 16 cooperates with the primary catalytic converter system 14 to enhance the overall conversion of harmful emissions from the engine during normal operation.

There are several PO catalyst materials suitable for use in the formation of the partial oxidation catalyst 16 used in the method embodying the present invention. These metals include rhodium, platinum, palladium, and/or nickel. In carrying out the method embodying the present invention, rhodium is the preferred catalytic material due to its higher thermal stability, since the ideal location for the PO catalyst 16 would be close to the exhaust ports of the engine 10 where high temperatures are expected. Rhodium also has benefits in reducing $NO_x$ emissions under rich and stoichiometric air-fuel ratio exhaust conditions, thereby augmenting, or supplementing, the catalytic reaction provided by the main catalytic converter 14 during normal engine operation. Many of the PO catalysts suffer from soot formation during steady-state rich operation, but very little soot is expected to form during the brief cold-start period, and the small amount that is formed should be easily oxidized during normal temperature operation of the engine.

In carrying out the method for reducing cold-start hydrocarbon emissions in gasoline, natural gas, or propane fueled engines, in accordance with the present invention, a partial oxidation catalyst 16 is positioned between the exhaust ports, or exhaust manifold 12, of the engine 10 and a catalytic converter 14. The engine 10 is then started from a cold-start, as defined by the above-referenced EPA definitions set forth in 40 CFR §86(b). The exhaust gas discharged from the engine during the initial period of operation from cold-start is adjusted such that the exhaust gas contains hydrocarbons and has an air-fuel ratio sufficient to provide a rich condition in the exhaust gas (the exhaust gas has a $\lambda$ value of <1.0). The exhaust gas thus discharged from the engine 10 during the initial period is passed through the partial oxidation catalyst 16 at a flow rate sufficient to provide a residence time in the PO catalyst 16 from about $10^{-2}$ seconds to about $10^{-5}$ seconds, whereby at least a portion of the hydrocarbon present in the exhaust gas discharged from the engine 10 is partially oxidized. The exhaust gas is then subsequently passed through the catalytic converter 16 and thence into the ambient environment.

If desired, the method for reducing cold-start hydrocarbon emissions in a gasoline, natural gas, or propane fueled engine, in accordance with the present invention, may include injecting supplemental air into the exhaust gas passed through the PO catalyst 16 prior to passing the exhaust gas through the catalytic converter 14 during the initial period of engine operation. Typically, the period of initial engine operation begins with the starting of the engine 10 from a cold-start and ends with the catalytic converter 14 reaching a predetermined operating temperature, generally referred to as the light-off temperature of the converter.

Simple use of a partial oxidation catalyst 16 will alleviate a significant portion of the cold-start hydrocarbon emission problem. However, if so desired, the partial oxidation catalyst 16 may be used in conjunction with other cold-start technologies discussed above in the Background Art section. For example, the PO catalyst 16 may be coated on an electrically heated catalyst, which would provide rapid heating and thereby promote faster light-off of the PO catalyst 16. Since the volume of the PO catalyst is relatively small, the power requirement could be significantly less than that required for a conventional full-sized electrically-heated catalytic converter.

Although the present invention is described in terms of a preferred exemplary embodiment, with specific illustrative sizes and shapes for the partial oxidation catalyst 16 and specific hydrocarbon-based fuels, those skilled in the art will recognize that changes in those sizes and shapes and fuels may be made without departing from the spirit of the invention which is directed to a method of engine operation during an initial period from a cold-start. Such changes are intended to fall within the scope of the following claims. Other aspects, features, and advantages of the present invention may be obtained from a study of this disclosure and drawing, along with the appended claims.

What I claim is:

1. A method for reducing cold-start hydrocarbon emissions in a gasoline, natural gas, or propane fueled engine, comprising:

providing a partial oxidation catalyst between an exhaust port of the engine and a catalytic converter;

starting the engine from a cold-start;

discharging an exhaust gas from the engine and introducing said exhaust gas into said partial oxidation catalyst during an initial period of engine operation, said exhaust gas introduced into said partial oxidation catalyst containing hydrocarbon and having an air/fuel ratio that has a $\lambda$ value of less than 1.0;

passing the exhaust gas introduced into said partial oxidation catalyst during said initial period through said partial oxidation catalyst at a flow rate sufficient to provide a residence time of from about $10^{-2}$ seconds to $10^{-5}$ seconds whereby at least a portion of the hydrocarbon present in the exhaust gas discharged from the engine is partially oxidized and converted into carbon monoxide and hydrogen: and, subsequently passing the exhaust gas passed through the partial oxidation catalyst through said catalytic converter and thence into an ambient environment.

2. A method for reducing cold-start hydrocarbon emissions in a gasoline, natural gas, or propane fueled engine, as set forth in claim 1, wherein said method includes injecting air into the exhaust gas passed through the partial oxidation catalyst and oxidizing at least a portion of the hydrogen produced by the partial oxidation catalyst during said initial period of engine operation by passing the exhaust gas through the catalytic converter.

3. A method for reducing cold-start hydrocarbon emissions in a gasoline, natural gas, or propane fueled engine, as set forth in claim 1, wherein the period of initial engine operation commences with said starting the engine from a cold-start and ends with said catalytic converter reaching a predetermined operating temperature and the $\lambda$ value of the air/fuel ratio of this exhaust gas discharged from said engine is $\geq 1$.

* * * * *